United States Patent [19]
Lamar, III et al.

[11] 3,950,547
[45] Apr. 13, 1976

[54] DIETARY COMPOSITION AND METHODS OF PREPARING

[75] Inventors: Percie L. Lamar, III, Palo Alto; Robert M. Marks, San Jose; Andrew Piggott, Woodside, all of Calif.

[73] Assignee: Syntex (U.S.A.) Inc., Palo Alto, Calif.

[22] Filed: Aug. 26, 1974

[21] Appl. No.: 500,239

[52] U.S. Cl. .................. 426/74; 426/590; 426/654; 426/656
[51] Int. Cl.² ........................................ A23K 1/175
[58] Field of Search ....... 426/72, 74, 200, 201, 212, 426/213, 215, 218, 96, 98, 103, 604, 656, 661, 590, 654

[56] References Cited
UNITED STATES PATENTS

| | | | |
|---|---|---|---|
| 2,566,549 | 9/1951 | Beckwith et al. | 426/74 |
| 2,808,336 | 10/1957 | Kalish | 426/201 |
| 2,961,320 | 11/1960 | Cuthbertson et al. | 426/72 |
| 3,764,346 | 10/1973 | Noznick et al. | 426/213 |

Primary Examiner—A. Louis Monacell
Assistant Examiner—C. A. Fan
Attorney, Agent, or Firm—Alan M. Krubiner; Lawrence S. Squires; William B. Walker

[57] ABSTRACT

Dietary compositions containing peptides and/or amino acids, lipids and carbohydrates, aqueous emulsions of the dietary composition, and methods of preparing such compositions and emulsions. The aqueous emulsions are characterized by improved stability, and correspondingly improved palatability, which is afforded by the use of high amylose starch in the composition. The dietary compositions are consumed in their aqueous emulsion form.

54 Claims, No Drawings

DIETARY COMPOSITION AND METHODS OF PREPARING

BACKGROUND OF THE INVENTION

1. The Invention

This invention relates to dietary compositions and to methods of preparing such diets. In a further aspect, this invention relates to dietary compositions which form stable emulsions, with water, of improved palatability. In a still further aspect this invention relates to low residue dietary compositions comprising peptides and/or amino acids, carbohydrates, lipids, and high amylose starch and the resulting liquid emulsions of such compositions with water and methods of preparing such compositions and emulsions.

2. The Prior Art

A number of synethetic or low residue diets have been provided by the prior art to provide the essential nutritional requirements of humans. Accordingly, such diets contain amino acids, and/or an amino acid source such as protein, carbohydrates and lipids, plus an emulsifying agent and optional ingredients such as vitamins and minerals; note, for example, U.S. Pat. Nos. 3,697,287 and 3,777,930. Although such diets have high nutritional value and could be used as a food replacement or supplement by normal human beings, they are primarily designed for pre- or post-operative patients or for patients with digestion problems. Two of the primary problems with respect to such diets are palatability or aesthetic appeal and since they are consumed as aqueous emulsions, the inability of the compositions to form stable aqueous emulsions for a prolonged period of time, even with the assistance of emulsifying agents. The prior art compositions typically form a two-phase liquid-liquid mixture, with water, one phase which is very rich in lipids and the other which is rich in amino acids and carbohydrates. Accordingly, when such emulsions are administered orally, the patient receives a substantially pure lipid layer which is particularly unpalatable, and when tube-fed directly to the stomach, results in a non-uniform nutrient flow to the patient.

Accordingly, prior art low residue diet mixtures formulated with amino acids, or with peptides, are very low in fat because no method is available to keep the lipid material in suspension and any attempt to formulate these diets at fat levels greater than 1% (liquid wt.) results in a product that separated and had a greasy mouth feel. This is a very critical problem where the product is to be consumed orally. Also low fat diets require a greater volume of diet to be consumed because the carbohydrate that is used to replace the fat has only approximately one half the calorie density per gram.

In addition the amino acid based low residue diet of the prior art typically have a poor taste due to the amino acids themselves, and exert a very high osmotic load on the digestive tract of the individual consuming the diet, and are further very susceptible to non-enzymatic browning.

Prior art formulas prepared with proteins are unacceptable for low residue diets because the proteins are not utilized efficiently by patients with certain gastrointestinal disorders. In contrast to the prior art protein diet, the predigested proteins in the form of peptides utilized in this invention, are absorbed as efficiently by patients with gastrointestinal disorders as free amino acid diets and further the peptide diet offers the advantage of contributing less osmotic load to the diet. Also the functional ability of the peptides to stabilize the fat in the diet is greater than amino acids and further peptides have substantially less of an undesirable taste than amino acids.

Accordingly we have discovered both peptide based and amino acid based low residue dietary compositions which form aqueous emulsions of greatly improved stability and accordingly increased palatability and aesthetic appeal.

SUMMARY OF THE INVENTION

In summary the dry form, or storage form, of the dietary compositions, of the invention, comprise peptides and/or amino acids, carbohydrates, lipids, high amylose starch, and preferably a small amount of an emulsifying agent. In summary the liquid emulsion form, or administration form, of the composition, of the invention, comprise an aqueous emulsion of the dietary composition of the invention, having a stability against separation, at room temperature, of at least 12 hours, and typically 24 hours or longer, and a refrigeration stability at 34°F (1.1°C) of about 48 hours or longer, after hydration.

In summary, the processes of the invention for preparing our composition comprises heating and homogenizing an aqueous mixture of the components of the composition, then steam injecting and drying the homogenized mixture. Alternatively the steam injected mixture can be cooled and stored under mild refrigeration and, if desired, subsequently dried, or canned and stored and distributed as an aqueous emulsion.

The invention will be further described herein below.

FURTHER DESCRIPTION OF THE INVENTION AND PREFERRED EMBODIMENTS

The peptide compositions of the invention comprise about from 3 to 40 wt. % peptide mixture; about from 7.5 to 90 wt. % carbohydrates, about from 2 to 35 wt. % lipids and in addition to the carbohydrates about from 0.5 to 16 wt. % gelatinized high amylose starch; and a high amylose starch to lipid wt. ratio of at least 0.25; and about from 0.05 to 10% of a water-lipid emulsifying agent. In addition, the composition can also comprise small amounts of other components desired for the nutritional well being of the patient and aesthetic appeal of the product such as, for example, amino acids (or pharmaceutically acceptable salts thereof), vitamins, minerals, flavoring, coloring, antioxidants and the like. In terms of aqueous emulsion stability, best results are obtained, wherein the dry dietary composition comprises about from 4 to 22 dry wt. % peptide mixture, about from 22 to 84 wt. % carbohydrates, about from 4 to 22 wt. % lipids and in addition to the carbohydrates about from 2 to 8 wt. % gelatinized high amylose starch; and about 0.4 to 2% of said water-lipid emulsifying agent and wherein the total free amino acid content of said composition is less than 1.5 %.

The peptide mixture used in our composition is a mixture of peptides in the proper relative quantities and ratio to provide all of the essential amino acid and such non-essential amino acids as are necessary to support all normal physiological functions dependent upon amino acids. Optionally the peptide mixture can also contain small amounts of amino acids either as by-products formed during the preparation of the peptide mixture or as additives designed to conform the amino acid residue profile of given peptide mixture to fit the nutritional requirements of a particular class of patients. Typically, and preferably, the peptide mixture will have an amino acid composition (i.e. the component amino acid moiety of the peptides and any free amino acids or salts) of egg albumin and accordingly will approach the biological value of egg albumin, and typically, and preferably, has a digestibility approaching 100%. Also peptide mixtures obtained from different protein sources could also be blended to obtain optimum amino acid residue profiles. As is well recognized by the art, the peptides and amino acids, if any, should be present in the proper amounts and relative ratio of essential and non-essential amino acid or amino acid residues to meet the human nutritional requirements. Also although our dietary composition can contain small amounts of amino acids, because of the problems inherent to amino acids discussed herein, the dietary composition should contain less than 5%, by wt., dry basis, of amino acids, and typically will contain from 0.0 to 1.5%, by wt., dry basis of amino acids. Typically, the peptide mixture will be primarily comprised of peptides having a molecular weight between 400 to 1000 with a maximum molecular weight of 2000, and typically the greatest distribution of peptides will have from four to eight amino acid residues. Typically the peptide mixture will have approximately the nutritional value afforded by high quality proteins such as, for example, afforded by eggs, fish, meat, and milk. One suitable and easily obtained peptide mixture, containing the proper nutritional balance, is the protein hydrolysate mixture afforded by the enzymatic or chemical hydrolysis of fish meal, oil seed proteins, leaf proteins, single cell proteins, or slaughterhouse animal scraps and blood. Such hydrolysates can be prepared according to conventional procedures such as described in U.S. Pat. Nos. 2,098,923, 2,180,637, 2,958,630, 3,697,285, 3,761,353 and can be conveniently prepared in an essentially tasteless form by the procedure described in U.S. application Ser. No. 473,255, filed May 24, 1974. As briefly mentioned above, such protein hydrolysates typically contain, in addition to peptides, about from 10 to 15%, wt., free amino acids; typically lysine, arginine, tyrosine, phenylalanine, and leucine.

The lipid component of the invention refers to edible lipids and are broadly as defined by Deuel, H. J. Junior, *The Lipids: Their Chemistry and Biochemistry*, Chemistry, Vol. 1, Interscience Publishers, New York (1951) and include fats, fatty acids, fatty oils, essential oils, waxes, sterols, phospholids, glycolipids, sulfolipids, aminolipids, chromolipids and the like. The nutritional importance of lipids is well known to the art and additional information relative thereto can be found in the literature, e.g. R. Amen, The Role of Fat as Nutrient, *Food Product Development*, June, 1973. Although a single lipid compound could be used as the lipid component, typically the lipids used in the composition will be a mixture of free fatty acids and/or triglycerides of fatty acids. Also the human nutritional requirements for linoleic acid is met in our diet by providing at least 0.4% total dry wt.) linoleic acid, typically in the form of esters, e.g. triglycerides of linoleic acid, and typically about from 0.4 to 2% total dry wt. of linoleic acid or esters thereof, or mixtures thereof, as part of the lipid component in our diet. Preferably the lipid mixture will contain a relative high ratio of polyunsaturated fatty acids and/or triglycerides of polyunsaturated fatty acids to saturated fatty acids and/or triglycerides of saturated fatty acids. The term relatively high ratio of unsaturated to saturated refers to a mole ratio of unsaturated free fatty acids and triglycerides of unsaturated fatty acids to saturated fatty acids and/or triglycerides of saturated fatty acids in excess of 1:1. The preferred high unsaturation lipids, also containing the required linoleic acid esters, are found in many naturally occurring substances which can be used directly in our composition such as, for example, soybean oil, corn oil, safflower oil, peanut oil, cottonseed oil, and the like, and mixtures thereof.

In a further embodiment a major portion of the lipid portion of our diet is composed of medium chain fatty acid triglycerides (i.e. triglycerides in which the fatty acid moieties have from six through 12 carbon atoms). The medium chain fatty acid triglcyerides are particularly desirable because of their high absorption efficiency in humans and thus are especially useful in diets for patients who, because of various digestive tract disorders, are unable to adsorb sufficient quantities of the higher fatty acid triglycerides. Accordingly, in this embodiment the lipid portion of the diet is composed of about from 70 to 85%, by wt., of medium chain fatty acid glycerides. Preferably the medium chain fatty acid triglycerides contain less than 5%, by wt., of the $C_{12}$ fatty acid triglycerides since the lower (i.e. $C_6$ to $C_{10}$) fatty acid triglycerides have greater human adsorption efficiency. Typically the medium chain fatty acid triglycerides will be supplied as a mixture of such triglycerides, however, the individual fatty acid triglycerides could also be used. Suitable medium chain fatty acid triglycerides can be conveniently obtained commercially in the form of fractionated coconut oils, babassu oils, palm kernal oils, and the like.

The carbohydrate portion of the composition can be supplied by any suitable carbohydrate source, for example, starches, dextrins, sugars and mixtures thereof. Where sugars are used to supply all or a part of the carbohydrate content, it is preferably to avoid the use of reducing sugars, e.g. monosaccharides (e.g. glucose, fructose) since such sugars can unduly increase the osmotic load. In addition these monosaccharides can react with amino acids, and especially lysine, to yield a product of reduced biological value. Hence, preferred sugars which can be used include, disaccharides, trisaccharides, tetrasaccharides or oligosaccharides. Such sugars include, for example, sucrose, maltose, and the like. Where starch is used as a carbohydrate source, the total starch content of the diet should not exceed 20%, wt. dry basis, and the total high amylose starch content (including that added in addition to the carbohydrate) should not exceed 16%; these latter limitations are necessary to maintain the proper viscosity. Suitable starches which can be used include, for example, corn starch, sorghum, potato, wheat, tapioca starch, rice starch and the like and the hydrolysate sugar products of such starches. Also mixtures of different sugars and starches and mixtures of sugars and starches could also be used. Typically, best results are obtained by using five to 42 Dextrose Equivalent corn syrup solids; five to 42 Dextrose Equivalent dextrins solids; sucrose and mixtures thereof.

The high amylose starch component of the dietary composition performs a critical part of the invention in dramatically increasing the emulsion stability of the composition. Hence, we have found that by using high amylose starch, we are able to obtain 10 to 100 times increase in emulsion stability over the conventional dietary composition, whereas the same composition, but using conventional starch (i.e. about 70% wt. amylopectin, 30% wt. amylose) in place of the high amylose starch, has an emulsion stability only slightly superior to the better emulsion forming composition of the prior art. We have also found that in order to ensure improved emulsion stability that a high amylose starch to lipid weight ratio of at least 0.25 should be used and preferably at least 0.3. The term high amylose starch refers to starches containing about 50% to 100% wt. amylose, typically about 55% to 90% amylose; and the remainder amylopectin. High amylose starch is typically obtained as a form of corn starch obtained from a species of corn which has been bred to yield high amylose starch, and is commercially available in amylose contents of from 50% to 100% wt., typically 55% to 85%, depending on genetic and environmental factors which influence the amylose content of the corn syrup. Additional information concerning high amylose starch can, for example, be found in the Trade Literature of the Art, for example, *A New Family of Starches*, Bulletin No. 214 of the Food Division of the National Starches and Chemical Corporation, New York, New York; and Amylomize VII Starches, Technical Service Bulletin, 2/2/71 — EMBP 71-26, of the American Mase-Products Company, New York, New York. Also, as is conventional with starches intended for human consumption, the high amylose starch must be pre-cooked to rupture the hydrogen bonding, etc., thus yielding what is referred to by the art as gelatinized starch. This can be conveniently effected by heating the high amylose starch, preferably in water, at about from 100° to 180°C for about from five seconds to two hours. The high amylose starch can be cooked prior to mixing with the other components of the composition, but as will be discussed herein below, is conveniently cooked in mixture with some or all of the other components of the mixture.

We have further found that by using high amylose starch, as described above, that we can obtain a substantial improvement in emulsion stability in predominantly amino acid low residue diets. Accordingly, the amino acid compositions of the invention comprise about from 3 to 40 wt. % amino acid mixture; about from 7.5 to 90 wt. % carbohydrates, about from 2 to 20 wt. % lipids and in addition to the carbohydrates about from 1 to 10 wt. % gelatinized high amylose starch to lipid wt. ratio of at least 0.3 and about from 0.1 to 12 wt. % of a water lipid emulsifying agent. Also as in the case of our peptide compositions, the total high amylose starch content should be 16 or less and the total starch content should be 20 or less. In addition, as previously described in the case of the peptide compositions of the invention, the amino acid compositions can also comprise small amounts of other components desired for the nutritional well being of the patient and aesthetic appeal of the product amino acids (or pharmaceutically acceptable salts thereof), vitamins, minerals, flavoring, coloring, antioxidants and the like. In terms of aqueous emulsion stability, best results are obtained, wherein the dry amino acid dietary composition comprises about from 4 to 22 dry wt. % amino acid mixture, about from 22 to 85 wt. % carbohydrate, about from 4 to 15 wt. % lipids and in addition to the carbohydrates about from 3 to 10 wt. % gelatinized high amylose starch, emulsifying agent 0.6 to 3 wt. %.

The amino acid mixture used in the composition is a mixture of amino acids, or pharmaceutically acceptable salts thereof, in the proper relative quantities and ratio to provide all of the essential amino acids and such non-essential amino acids as are necessary to support all normal physiological functions dependent upon amino acids. Optionally the amino acid mixture can also contain small amounts (up to 10% wt. of the amino acid mixture) of peptides and/or proteins. Preferably, the composition of the amino acid mixture will approximate the amino acid profile of egg albumin and preferably will approach 100% digestibility. The proper amino acid profile to meet nutritional requirements is well known to the art and further information relative thereto can be obtained from the literature, e.g. note discussion of nutritional amino acid requirements in U.S. Pat. Nos. 3,697,287 and 3,701,666 and the references cited therein.

However, despite the stability improvement afforded by the amino acid embodiment of the invention over the prior art compositions, we have found that peptide compositions, of our invention, afford a number of advantages over both amino acid low residue diets and protein diets in that peptides provide a readily available source of amino acids without the very noticeable objectionable taste possessed by a number of the amino acids required in amino acid nutritional diets. Further, we have found that it is much easier to maintain the osmolality of the resulting dietary aqueous emulsions with peptide dietary compositions than it is with free amino acid dietary composition. This is particularly important as osmolatic loads near 1000 milliosmoles will induce a dumping syndrome in the patient producing diarrhea or nausea and vomiting. Hence, we have found it is much easier to obtain emulsions systems having osmotic loads of less than 650 milliosmoles using peptide systems than with amino acid systems since the osmolality is a function of the moles or molecules present and thus in terms of a given weight of material is inversely proportional to the molecular weight of the molecule. A further disadvantage of amino acid systems is the tendency of amino acids to undergo Maillard reaction with the carbohydrate (sugar) component resulting in a hard carmel-like substance. The non-enzymatic browning products of the Maillard reaction are nutritionally inferior to the original ingredients and after a point the aesthetic appeal of the product is diminished. Peptides are also subject to this reaction but react much less readily than amino acids.

As in the case of the prior art dietary compositions, we have found it desirable to use an emulsifying agent in our compositions. Suitable emulsifying agents which can be used include those categorized as having a hydrophilic, lipophilic balance (HLB) of about from 8 to 14.5. We have also found that although generally emulsifying agents having lower HLB exhibit poorer results, there are exceptions. There are differences in performances of emulsions with similar HLB because of different chemical compositions. We have found that best results are obtained in terms of improved emulsion stability, by using diacetyl tartaric ester of monoglycerides having a saponification number of about from 405 to 425 (AOCS Cd 3-25) and an Iodine Number of about from 60 to 70 (KL-681.1) as the emulsifying agent. In the peptide dietary composition, of our invention, typically about from 0.05 to 10%, by wt., dry basis, of the emulsifying agent is used and typically best results are obtained by using 0.4 to 2%, dry wt. basis. In the amino acid based compositions, of our invention, we have generally found it desirable to use slightly higher quantities of the emulsifying agent, accordingly, typically about from 0.1 to 12%, dry wt. basis, of the emulsifying agent is used in the amino acid based compositions and typically best results are obtained using about from 0.6 to 3%, dry wt. basis. However, quantities, of emulsifying agents, both above and below these ranges can be used depending upon the particular emulsifying agent. Optimum quantities for a given system can be determined by routine experimentation. Also as is recognized by the art, subsequent processing steps influence the effectiveness of the emulsifying agents, for example, emulsifying agents having high HLB (e.g. 8–15) are more effective where the material is spray-dried and lower HLB (e.g. 2–5) are more effective in materials which are heat treated (e.g. sterilized) as a liquid.

Optionally the composition can also contain small amounts of vitamins, minerals, medicaments, antacid or buffering agents such as are conventionally added to such dietary compositions or which are desirable for given class of class patients. Typically, such additives form only a small part of the composition on a weight basis, for example, such additives are typically added to provide a total vitamin content of about from 0.001 to 0.005 wt. %, total mineral content of about from 1 to 10% in the total antacid content of about from 0.1 to 0.5%. Suitable vitamin components include, for example, vitamin A, vitamin D, vitamin $B_{12}$, vitamin C, p-aminobenzoic acid, pantothenic acid, calcium pantothenate, folic acid, choline, inositol, niacinamide, riboflavin, pyridoxine, thiamine, and pharmaceutically acceptable salts of the acids enumerated above, and the like. Suitable minerals include, for example, sources, typically salts, of sodium, potassium, calcium, magnesium, iron, copper, zinc, iodide. The desirability of mineral salts in nutritional diets is well known to the art and additional information relative thereto can be found in the literature, e.g. R. Amen, Minerals as Nutrients, *Food Product Development*, September, 1973; R. Amen, Trace Minerals as Nutrients, *Food Product Development*, October, 1973. Suitable buffering agents include, for example, sodium acetate and the like.

Also, if desired, the composition can contain small quantities of flavoring agents to further enhance palatability. Suitable flavoring agents which can be used, include, for example, natural and imitation chocolate, vanilla, fruit flavors such as lime, orange, lemon or other citrus flavors, peach, strawberry, cherry, or other conventional flavoring agents. Typically the flavoring agents are conventionally available as concentrates or extracts or in the form of synthetically produced flavoring esters, alcohols, aldehydes, terpines, sesquiterpines, and the like. Typically, such flavoring agents are added in quantities in the range of about from 0.01 to 2.0% wt. (dry basis).

The dry dietary compositions, of the invention, can be prepared by simple mixing and blending of the respective components, followed by heat treatment at about from 65° to 95°C for about from 5 to 15 minutes. Higher temperatures could also be used but are not necessary. In this case the high amylose starch must be first gelatinized, by precooking, in water, at about from 115° to 140°C for about from 5 to 20 seconds. Again higher cooking temperatures can be used but are unnecessary. We have further found that the dry dietary composition can be conveniently and efficiently prepared, by pre-blending the components in a liquid mixture, e.g. water, to a solids content 20 to 60% wt., preferably 35 to 45% wt., and then homogenizing the liquid mixture at pressures of between 1500 to 3000 psi and passing the homogenized mixture through a steam injector operating at temperatures of about from 120° to 150°C, preferably 125° to 135°C, and pressures of about from 70 to 95 psig and then sterilizing the mixture by holding it at temperatures in the range of about from 125° to 140°C for about from 10 to 15 seconds. The temperature required to gelatinize the high amylose starch will increase with higher solids content in mixture, however, temperatures in excess of 150°C are unnecessary. In this case the high amylose starch does not have to be pre-cooked as the starch is cooked during the steam injection step. Thus, the steam injection step performs the function of gelatinizing the high amylose starch and also enhancing mixing of the composition and further depending on the degree of heating, also pasteurizes, or sterilizes, the material. The steam injection can be conducted according to conventional procedures well within the scope of those skilled in the art; note, for example, U.S. Pat. No. 2,684,949.

The liquid mixture from the steam injector can then be dried according to conventional procedures such as, for example, spray drying; freeze drying or drum drying; although generally spray drying is preferred. Also because the possibility of non enzymatic browning occurring in the dried dietary composition between the carbohydrate and the amino acid and peptide components, it is preferable to store and package the dietary composition under relatively anhydrous conditions at temperatures below 70°F. Alternatively the product issuing from the steam injection can be canned, by conventional procedures, and hence distributed as an aqueous emulsion ready to serve as a liquid concentrate to be diluted with water prior to consumption. The desired emulsion solids content can be provided by proper content of the steam injection step as is well known to the art.

The liquid emulsion form of the dietary composition, of the innvention, is the form in which the composition will actually be consumed orally by the patient or tube-fed directly to the patient's stomach. The liquid emulsion can be prepared as desired above or can be easily prepared simply by mixing the dry dietary composition with water in the proper ratio to provide a solid content of 10 to 50% wt., and typically 15 to 30%. The resulting emulsion will have a viscosity in the range of about from 2 to 100 centipoise and an emulsion stability under mild refrigeration (e.g. 1°–3°C) of at least one day and typically about two to three days. The refrigeration stability is important in hospital use, since it permits the hospital to prepare an entire day's supply of the diet at a single time without fear of the material layering out or oiling off. The emulsions are also sufficiently stable to permit larger quantity to be prepared, but typically this is impractical. Also where it is desired to gravity tube-feed the emulsion, the high amylose starch content should be maintained below 6.6% on a dry wt. basis in order to provide an emulsion having a viscosity of 25 centipoise or less. Also although water will typically be the liquid medium of choice, other pharmaceutically acceptable mediums could also be used.

DEFINITIONS

As used herein above and below, the following terms have the following meanings unless expressly stated to the contrary. With respect to emulsifying agents, the term hydrophilic lipophilic balance (HLB) refers to the relative size and strength of the molecule of the emulsifier which is water soluble to the portion of the molecule which is lipid soluble. The HLB system of classifying emulsifiers indicates the type of emulsion which will be produced, e.g. water in oil or oil in water, but it does not indicate the efficiency of emulsification. [Philip Sherman, *Emulsion Science*, page 1, Academic Press, New York (1968).] The abbreviation AOCS refers to analytical procedures described by the American Oil Chemists Society. The abbreviation KL refers to standard analytical procedures described by the Kilborn Laboratories Division of the Witco Chemical Company of Chicago, Illinois.

The term Iodine No. refers to a measure of the amount of unsaturated fatty acid present in material (e.g. fat) expressed as the number of grams of iodine absorbed by 100 grams of material.

The term Saponification No. refers to a number of grams of KOH required to neutralize the free or combined fatty acid in one gram of the material.

The term percent (%) refers to weight % on a dry weight basis, unless referring to the emulsion solids content or specifically referring to the emulsion in which case it is based on the total weight of the emulsion.

The term pharmaceutically acceptable or nutritionally usable has been used as a prefix describing various agents to indicate agents or materials which do not significantly adversely affect the pharmaceutical or nutritional properties of the composition, for example, toxicity; assimilation by human systems.

A further understanding of the invention can be had from the following non-limiting examples.

PREPARATION 1

This preparation illustrates the preparation of a preferred peptide mixture, suitable for use in the composition of the invention, according to the procedure described by Perini in U.S. Ser. No. 473,255, filed May 24, 1974.

In this preparation 462 lbs. of fish protein concentrate is admixed to 4600 lbs. of deionized water at a temperature of about 45°C. The pH of the mixture is adjusted to about pH 8.5 ± 0.2 by the controlled addition of calcium hydroxide, about 5 lbs. is required. Four pints of toluene and four pints of chloroform are then added to the mixture as biostatic agents and the resulting mixture is heated to about 42°C, then 13.9 lbs. of pancreatin 4 × N.F. (National Formulary XII - monograph 287) is added. Upon digestion of the fish protein concentrate, the pH of the reaction mixture decreases and is controlled at about 7.7 ± 0.3 by the addition of calcium hydroxide at half hour intervals for approximately four to five hours, about 15 to 20 lbs. of calcium hydroxide is required. The digestion is allowed to continue for an additional 14–15 hours, at the end of which time the pH has dropped to about 7.4 ± 0.2. The pH is then adjusted to 7.0 ± 0.1 by the addition of 85%, by wt., aqueous phosphoric acid. The reaction mixture is then heated to 143°F (62°C) for 30 minutes to deactivate the pancreatin enzyme complex and is then pumped through a filter press at the rate of 25 to 40 gal. per minute using only the basic calcium phosphate precipitate formed after the addition of the phosphoric acid as the filter aid. The filtrate is recovered and admixed with 60 lbs. of powdered activated charcoal and mixed for 30 minutes and then filtered to remove the charcoal. The charcoal filter cake is washed with 100 gal. of hot water (about 65°C) and combined with the filtrate. The combined filtrate and washing is heated and condensed by evaporation to solids content of approximately 10%. The concentrate is cooled to 4.5°C and then spray dried affording approximately 260 lbs. of protein hydrolysate as a substantially white powder. A sample of the product is then dissolved in water forming an essentially colorless clear solution having no discernible taste.

EXAMPLE 1

This example illustrates as scaled-up commercial size procedure for preparing the dietary composition of the invention. In this example 4.17 lbs. of high amylose starch (70% wt. amylose, 30% wt. amylopectin) is admixed with 150.0 lbs. of an aqueous peptide mixture containing 10.5 lbs. of peptides, prepared according to Preparation 1, and having a solids content of 7% wt. The resulting mixture is continuously stirred and heated and the following ingredients added: 2.35 lbs. of potassium gluconate, 0.456 lbs. of tricalcium phosphate, 0.806 lbs. sodium chloride, 0.58 lbs. dibasic magnesium phosphate, 0.322 lbs. calcium citrate, 2.1378 g. manganese gluconate, 15.1189 g. ferrous gluconate, 0.369 g. cupric gluconate, 3.945 g. zinc acetate and 0.0196 g. potassium iodide, followed by the addition of 65.54 lbs. of corn syrup solids (24 dextrose equivalents) and 6.83 lbs. of sucrose. Concomitantly with the preparation of this mixture, a lipid mixture is prepared containing 10.2 lbs. of corn oil, 0.8 lbs. of a diacetyl tartaric acid glyceride ester emulsifying agent sold under the trademark Emcol AA-45 by the Witco Chemical Corp., Chicago, Illinois, 0.5 lbs. of vanilla flavor and vitamins A, D, E and K in the proper amounts to afford the composition indicated in Table A below. The lipid mixture is then heated to about 57°C ± 3°C and then added to the peptide corn syrup mixture after the temperature of that mixture had reached 60°C ± 3°C. Phenylalanine, tryptophan, methionine, isoleucine, and valine are then added to the mixture in the proper amounts to provide the composition indicated in Table A and the resulting mixture then heated to 71°C. The mixture is then pumped to a homogenizer and homogenized at about 2700 psi, and then pumped to a continuous steam injector operating and controlled at a mixing section temperature of about 265°F-270°F (129.5° to 132.2°C.). The mixture passing the steam injector is maintained at about 129.5° to 132.2°C for a period of 11 seconds to effect sterilization of the mixture, and then cooled to about 15°C and the water soluble vitamins $B_1$, $B_2$, $B_6$, $B_{12}$, niacinamide, pantothenic acid, folic acid, choline, ascorbic acid and biotin added in the proper amount to provide the composition indicated in Table A below. The mixture is then sprayed affording 100 lbs. of dried product having the composition indicated in Table A, which within plus or minus 10–15% variance of the respective components represents the best embodiment of this aspect of the invention.

TABLE A

Moisture-free weight of

TABLE A-continued

| | ingredients per 100 lbs. of moisture free solids | |
|---|---|---|
| Peptide digest (7% solids)* | 10.5 | lb. |
| Amino acid supplement | 0.907 | lb. |
| 10.87% l-tryptophan  0.0986 lb. | | |
| 20.65% l-isoleucine  0.1873 lb. | | |
| 28.26% l-phenylalanine  0.2563 lb. | | |
| 18.48% l-methionine  0.1676 lb. | | |
| 21.74% l-valine  0.1972 lb. | | |
| Corn oil | 10.2 | lb. |
| Emulsifier** (Emcol AA-45) | 0.8 | lb. |
| Total carbohydrate (72.9 lbs.) | | |
| Frodex 24 (corn syrup solids) | 62.269 | lb. |
| Sucrose 6.8 | | |
| High Amylose Starch (70% amylose, 30% amylopectin) | 3.75 | lb. |
| Potassium gluconate | 2.35 | lb. |
| Tricalcium phosphate | 0.456 | lb. |
| Sodium chloride | 0.806 | lb. |
| Magnesium phosphate, dibasic .3 $H_2O$ | 0.40 | lb. |
| Calcium citrate .4 $H_2O$ | 0.281 | lb. |
| Manganese gluconate | 2.1378 | gm. |
| Ferrous gluconate | 15.1189 | gm. |
| Cupric gluconate | 0.369 | gm. |
| Zinc acetate | 3.945 | gm. |
| Potassium iodide | 0.0196 | gm. |
| Firmenich Imitation Vanilla Flavoring | 0.10 | lb. |
| Vitamin A, D, E and K blend (1) | 6.7432 | gm. |
| Vitamin B mix (2) | 5.372 | gm. |
| Choline chloride | 30.000 | gm. |
| Sodium ascorbate | 30.000 | gm. |

(1) Vitamin A, D, E and K Blend

| Source | Potency | Units per gram of vitamin mix |
|---|---|---|
| Vitamin A palmitate | 1 million I.U./gm. | 86,789 I.U. |
| Crystalline Vitamin $D_3$ | 1 million I.U./gm. | 6,364.5 I.U. |
| Alpha tocopheryl acetate (E) | 543.6 I.U./gm. | 491.75 I.U. |
| Vitamin $K_{1 (x)}$ | 100% | 2.17 mg. |

| (2) Vitamin B Mix | Units per gram of vitamin mix | |
|---|---|---|
| Thiamine mononitrate | 44.676 | mg. |
| Riboflavin | 51.75 | mg. |
| Pyridoxine HCl | 55.1 | mg. |
| d-calcium pantothenate | 235.29 | mg. |
| Niacinamide | 452.345 | mg. |
| Folic acid | 9.1214 | mg. |
| Biotin | 6.5153 | mg. |
| Vitamin $B_{12}$ (0.1% concentration) | 145.197 | mg. |

*Prepared according to Preparation 1.
**Diacetyl tartaric acid esters of mono and diglycerides sold under the trademark Emcol AA-45 by the Witco Chemical Company of Chicago, Illinois.

EXAMPLE 2

This example illustrates the improved emulsion characteristics of the invention as compared with identical compositions but either using no starch component or using normal starch (i.e. 30% amylose, 70% amylopectin) or waxy starch (100% amylopectin). Three sets of aqueous emulsions (23% solids) are prepared having different fat concentrations as follows; one set having a fat content of 2.35%, second set having a fat content of 4.70%, and the third set having a fat content of 9.40%. In each instance the emulsions are prepared using the basic formulation described in Example 1, but varying the relative ratios of fat (corn oil) and corn syrup solids to provide the specified fat content in the emulsion while maintaining the total solids content constant at 23% and the peptide mixture content constant at 2.4% (wet wt.). In the formulations containing starch, a 1% (wet wt.) starch content is used and in the control formulations not containing starch, the content of corn syrup solids is increased accordingly (i.e. by 1%, wet wt.).

The respective starch emulsions (whether high amylose starch, normal starch or waxy starch) are prepared by mixing all the ingredients and heating the mixture to 71°C. The mixture is homogenized at 2,700 psi and then passed directly to a steam injector where it was heated to 132°C ± 3°C. The hot liquid passed from the steam injector to a holding section for a residence time of 11 seconds, then it was flash cooled to approximately 49°C in a vacuum chamber. The emulsion was further cooled in a water jacket heat exchanger and stored at 2°C ± 0.5°C. The non-starch containing emulsions are prepared in the same manner.

The respective emulsions are tested at one half hour, two hour, 16 hour and 40 hour intervals for the emulsion characteristics indicated in the following tables, summarizing the results of these tests.

The respective emulsions are tested for the following emulsion characteristics:

1. Stability against separation. This is measured by preparing two sub samples of each emulsion in a graduated clear glass container and recording the percent volume of fat that separates, the volume of water rich phase that forms and the quantity of oil rich phase that remains at time intervals of one half hour, two hour, 16 hour and 40 hour.

2. Size distribution of Miscelles in the initial emulsion. The Micelle size distribution is determined by examining twenty randomly selected 10µ fields. The size is grouped into the percent fields that contained Micelles greater than 10.0µ, 5.0–10.0µ, and less than 5.0µ.

3. Heat stability. Samples are heated at 71°C for two hours, then visually evaluated for signs of separation in the emulsion.

4. Shear stability. Emulsion stability to high energy shear is measured by treatment of approximately 500 ml. of sample for five minutes at high speed (3200 r.p.m.) in a waring blender. This is followed by a holding period of 5 minutes, then the emulsion samples are examined for signs of separation.

5. Viscosity. Viscosity is determined using a Brookfield model LVF viscosimeter running at 60 r.p.m.

The results of these tests are summarized in the following tables.

TABLE 1

STABILITY AGAINST SEPARATION

| Lipid (Corn Oil) Wet Wt. % | Type Starch | | | |
|---|---|---|---|---|
| | None | Waxy | Normal | High Amylose |
| | % Oil Rich Phase at ½ Hour | | | |
| 2.35 | 100 | 100 | 100 | 100 |
| 4.70 | 99 | 90 | 100 | 97 |
| 9.40 | 5 | 65 | 18 | 95 |
| | % Oil Rich Phase at 2 Hours | | | |
| 2.35 | 100 | 100 | 100 | 99 |
| 4.70 | 98 | 90 | 98 | 94 |
| 9.40 | 2 | 20 | 20 | 90 |
| | % Oil Rich Phase at 16 Hours | | | |
| 2.35 | 100 | 6 | 100 | 94 |
| 4.70 | 95 | 10 | 5 | 81 |
| 9.40 | 1 | 17 | 20 | 74 |
| | % Oil Rich Phase at 40 Hours | | | |
| 2.35 | 95 | 6 | 0 | 94 |
| 4.70 | 2 | 13 | 3 | 81 |
| 9.40 | 1 | 16 | 8 | 74 |

In the above Table 1, an oil rich phase dispersed through 100% of the emulsion indicates a stable emulsion whereas unstable, or less stable, emulsions are indicated by a decrease in the oil rich phase of the emulsion with concomitant increase in either or both of the free oil or the water rich phase. By increasing the oil concentration to 9.4%, the emulsion systems are stressed beyond their expected stability limits. The data in Table 1 showed that the high amylose starch systems had the greatest stability over a 40 hour period for all oil levels, and that, as would be expected, the stability of all the emulsions decreased with increasing oil content.

TABLE 2

MICELLE SIZE DISTRIBUTION

| Lipid (Corn Oil) Wet wt. % | Type Starch | | | |
|---|---|---|---|---|
| | None | Waxy | Normal | High Amylose |
| Percent Micelles less than 5 Microns | | | | |
| 2.35 | 90 | 70 | 70 | 80 |
| 4.70 | 92 | 62 | 0 | 10 |
| 9.40 | 42 | 22 | 0 | 15 |
| Percent Micelles Greater than 10 Microns | | | | |
| 2.35 | 8 | 18 | 28 | 2 |
| 4.70 | 8 | 8 | 90 | 40 |
| 9.40 | 3 | 30 | 32 | 45 |

Generally, emulsion stability increases with the proportion of micelles less than $5\mu$. However, for the emulsions formulated with peptides, the data, illustrated by Table 2, fails to indicate any readily discered correlation between micelle size distribution and stability.

TABLE 3

| Lipid (Corn Oil) Wet Wt. % | Heat Stability at 160°F (71°C) | | | |
|---|---|---|---|---|
| | Type Starch | | | |
| | None | Waxy | Normal | High Amylose |
| 2.35 | Y | N | Y | N |
| 4.70 | N | N | Y | N |
| 9.40 | N | N | N | N |

Y = Moderately stable
N = Unstable

None of the emulsions exhibit good heat stability at 71°C although the emulsions using normal starch or no starch exhibit slightly better heat stability than the waxy or high amylose starch systems.

TABLE 4

| Lipid (Corn Oil) Wet Wt. % | SHEAR STABILITY | | | |
|---|---|---|---|---|
| | Type Starch | | | |
| | None | Waxy | Normal | High Amylose |
| 2.35 | Y | N | Y | N |
| 4.70 | N | N | N | N |
| 9.40 | N | N | N | N |

Y = Moderately stable
N = Unstable

None of the emulsions are significantly stable under high energy shearing conditions.

TABLE 5

VISCOSITY OF EMULSION (CENTIPOISE AT 73°F or 23°C)

| Lipid (Corn Oil) Wet Wt. % | Type Starch | | | |
|---|---|---|---|---|
| | None | Waxy | Normal | High Amylose |
| 2.35 | 4.6 | 8.9 | 9.0 | 32.7 |
| 4.70 | 5.4 | 8.9 | 9.4 | 32.9 |
| 9.40 | 5.3 | 8.4 | 8.5 | 29.2 |

Viscosity of the peptide emulsions formulated with high amylose starch are approximately two times that of emulsions formulated with waxy or normal starch (Table 5).

EXAMPLE 3

In this example the procedure of Example 2 is repeated, but in this instance a free amino acid mixture, described in Table A below, corresponding to the amino acid profile of the peptide mixture used in Example 2 is used in place of the peptide mixture. The results of these tests are described in Tables 1A–5A below. As can be seen from these tables, our amino acid-fat emulsion using high amylose starch are superior to those using waxy starch or normal starch, or no starch, but are inferior to the corresponding peptide emulsions described in Example 2.

TABLE A

| Amino Acid | % Wt |
|---|---|
| Lysine | 10.64 |
| Histidine | 3.03 |
| Arginine | 6.44 |
| Aspartic Acid | 10.85 |
| Threonine | 5.05 |
| Serine | 4.34 |
| Glutamic Acid | 15.98 |
| Proline | 3.50 |
| Cystine | 0.52 |
| Glycine | 4.73 |
| Alanine | 6.48 |
| Valine | 5.73 |
| Methionine | 3.24 |
| Isoleucine | 4.70 |
| Leucine | 8.69 |
| Tyrosine | 2.75 |
| Phenylalanine | 3.23 |
| | 100.00 |

TABLE 1A

STABILITY AGAINST SEPARATION

| Lipid (Corn Oil) Wet Wt. % | Type Starch | | | |
|---|---|---|---|---|
| | None | Waxy | Normal | High Amylose |
| % Oil Rich Phase at ½ Hour | | | | |
| 2.35 | 100 | 3 | 100 | 100 |
| 4.70 | 98 | 8 | 90 | 93 |
| 9.40 | 95 | 24 | 25 | 80 |
| % Oil Rich Phase at 2 Hours | | | | |
| 2.35 | 100 | 3 | 100 | 99 |
| 4.70 | 97 | 8 | 1 | 83 |
| 9.40 | 94 | 23 | 20 | 80 |
| % Oil Rich Phase at 16 Hours | | | | |
| 2.35 | 10 | 8 | 2 | 90 |
| 4.70 | 0 | 10 | 1 | 72 |
| 9.40 | 3 | 22 | 0 | 60 |
| % Oil Rich Phase at 40 Hours | | | | |
| 2.35 | 7 | 5 | 0 | 90 |
| 4.70 | 0 | 10 | 1 | 72 |
| 9.40 | 2 | 22 | 0 | 60 |
| Viscosity of Emulsion (centipoise at 73°F or 23°C) | | | | |
| 2.35 | 5.9 | 9.6 | 11.2 | 44.8 |
| 4.70 | 5.4 | 10.1 | 10.1 | 55.3 |
| 9.40 | 4.5 | 9.5 | 10.9 | 60.3 |

EXAMPLE 4

In this example the procedure of Example 2 is repeated, but in place of the peptide mixture using a functional fish protein (prepared by low temperature isopropanol extraction of red hake - i.e. *Urophysis chuss*). As can be seen from the results summarized in the following tables, the protein-fat emulsions formed using high amylose starch are superior in each instance as to the corresponding mixtures obtained using waxy starch or normal starch or no starch and the protein-fat emulsions using high amylose starch is equal or superior to that using amino acids, and also to those obtained using peptides. However, because amino acids and peptides are much more readily absorbed by patients with a number of digestive disorders than proteins, the amino acid emulsions are, and especially the peptide emulsions, preferable despite the superior emulsions stability characteristic of the protein emulsions.

TABLE 1B

STABILITY AGAINST SEPARATION

| Lipid (Corn Oil) Wet Wt. % | Type Starch | | | |
|---|---|---|---|---|
| | None | Waxy | Normal | High Amylose |
| % Oil Rich Phase at ½ Hour | | | | |
| 2.35 | 94 | 25 | 90 | 100 |
| 4.70 | 94 | 35 | 90 | 100 |
| 9.40 | 96 | 50 | 90 | 100 |
| % Oil Rich Phase at 2 Hours | | | | |
| 2.35 | 85 | 25 | 90 | 99 |
| 4.70 | 90 | 35 | 90 | 99 |
| 9.40 | 90 | 50 | 90 | 99 |
| % Oil Rich Phase at 16 Hours | | | | |
| 2.35 | 10 | 22 | 80 | 98 |
| 4.70 | 5 | 35 | 16 | 97 |
| 9.40 | 6 | 40 | 40 | 70 |
| % Oil Rich Phase at 40 Hours | | | | |
| 2.35 | 8 | 22 | 80 | 97 |
| 4.70 | 8 | 30 | 10 | 97 |
| 9.40 | 8 | 40 | 30 | 70 |
| Viscosity of Emulsion (centipoise at 23°C) | | | | |
| 2.35 | 8.0 | 14.7 | 13.6 | 20.6 |
| 4.70 | 6.8 | 16.9 | 13.0 | 23.4 |
| 9.40 | 6.8 | 18.8 | 13.9 | 26.2 |

EXAMPLE 5

In this example the procedures of Example 2 are followed but using 55% high amylose starch and 70% high amylose starch and varying both the oil content and high amylose starch content. The solids content is maintained constant 23%, by wt., by using the peptide composition prepared according to Example 1 and adjusting the amount of corn syrup solids to compensate for the variations in oil content and starch content. The respective emulsions are subjected to the same tests as described in Example 2 and then given an overall emulsion stability rating based on these tests. In making this evaluation, the oil separation test is given most weight as indicative of emulsion stability. An overall rating of 100 indicates emulsions which are very stable against separation and a zero score indicates very unstable emulsion — i.e. complete separation of the oil and water into two phases. The results of these tests are summarized in the following Table 6. Also, generally the 55% high amylose starch emulsions had slightly higher viscosities whereas micelle size distribution, heat stability and shear stability was about equal for both the 55% and 70% amylose starches.

TABLE 6

| Lipid (Corn Oil) Wt. %* | Overall Emulsion Stability | | |
|---|---|---|---|
| | 55% Amylose Starch Concentration (wt. %) | | |
| | 0.5 | 1.0 | 2.0 |
| 0.65 | 100 | 100 | 100 |
| 1.90 | 50 | 100 | 100 |
| 5.70 | 40 | 60 | 100 |
| | 70% Amylose Starch Concentration (wt. %) | | |
| 0.65 | 100 | 100 | 100 |
| 1.90 | 60 | 80 | 80 |
| 5.70 | 20 | 50 | 70 |

*based on total emulsion (i.e. wet weight).

As can be seen from the above table, optimum stability for all levels of high amylose starch occurs at oil concentrations below 1.9 wt. %. The systems which contained 1.0% starch are capable of stabilizing 1.9% oil but less than 5.7% oil and the systems which contained 2.0% starch are capable of stabilizing greater than 5.7% oil. Further the emulsions prepared with 55% and 70% amylose starch showed no signs of mineral precipitation. In general, as the level of lipid in the diet increased, the stability of the emulsion decreased. As fat increased, concomitant increases in the starch gave improved stability. Also the viscosity generally decreased as the fat content of the emulsion increased for emulsions with the same concentration of starch.

EXAMPLE 6

In this example the procedures of Example 2, with respect to the high amylose starch emulsions, and Example 5 are repeated but using a variety of commercially available emulsifying agents and mixtures thereof, in place of the emulsifying agent used in Example 2 and Example 5. The respective emulsions are tested and evaluated as described in Example 2 and the respective emulsifiers given an overall rating with respect to their ability to encourage stable emulsions in high amylose starch systems. A rating of from 100 for very stable emulsions to 0 for unstable emulsions (complete separation of oil and water into two phases). The results of this evaluation is summarized in the following Table 7.

TABLE 7

| Emulsifying Agent Class | Sold under the Trademark | Commercial Source | HLB* | Stability Rating |
|---|---|---|---|---|
| none | — | — | — | 40 |
| diacetyl tartaric acid esters of mono and di-glycerides | Emcol AA-45 | Witco Chemical Co. of Chicago, Ill. | 15 | 100 |
| mono and di-glycerides | Atmos 300 | ICA America Corp. of Willmerton, Delaware | 2.8 | 70 |
| mono and di-glycerides | Atmos 150 VS | ICA America Corp. of Willmerton, Delaware | 3.2 | 100 |
| mono and di-glycerides | Atmul 124 | '' | 3.5 | 100 |
| mono and di-glycerides + polysorbates | Tween-Mos 240 VS | '' | 4.3 | 50 |
| mono and di-glycerides + polysorbate | Tween-Mos 100 K | '' | 5.2 | 90 |
| polyoxyethyl-ene[20]sorbitan monooleate | Tween 80 | '' | 15.0 | 60 |
| polyoxyethyl-ene[20]sorbi- | | | | |

TABLE 7-continued

| Emulsifying Agent Class | Sold under the Trademark | Commercial Source | HLB* | Stability Rating |
|---|---|---|---|---|
| tan monosterate | Tween 60 | " | 14.9 | 100 |
| sorbitan mono-sterate | Span 60 | " | 4.7 | 70 |
| Mixtures | | | | |
| Span 60 wt. % | Tween 60 wt. % | | | |
| 87 | 13 | | 6 | 70 |
| 68 | 32 | | 8 | 100 |
| 48 | 52 | | 10 | 90 |
| 28 | 72 | | 12 | 100 |
| 6 | 94 | | 14 | 100 |

*HLB: Hydrophilic Lipophilic Balance

As can be seen from the above table, the high amylose starch systems provide stable emulsions with a wide variety of emulsifying agents and especially the emulsifying agents (and mixtures) rated at 100.

Obviously many modifications and variations of the invention, described herein above and in the claims, can be made without departing from the essence and scope thereof.

We claim:

1. A dry dietary food composition, for consumption mixed with water as an aqueous emulsion having improved stability, comprising, by dry wt., about from 3 to 40% of a nutritionally balanced peptide mixture, or amino acid supplemented peptide mixture, said peptide mixtures having a total amino acid profile sufficient to support normal human physiological functions; about from 2 to 35% lipid, said lipid containing sufficient linoleic acid or esters thereof, to provide said composition with a linoleic acid source content of at least 0.4%; about from 7.5 to 90% carbohydrate; about from 1 to 16% of a gelatinized high amylose starch, containing at least 50%, by wt., amylose; and about from 0.05 to 10% of a water-lipid emulsifying agent, and wherein said composition has a weight ratio of said high amylose starch to said lipid of at least 0.25, and wherein the total high amylose starch content of said composition is 16% or less and the total starch content is 20% or less and the total free amino acid content of said composition is less than 5%.

2. The composition of claim 1 wherein said total amino acid profile essentially corresponds to the amino acid profile of egg albumin.

3. The composition of claim 1 wherein said peptide-amino acid mixture is a protein hydrolysate.

4. The composition of claim 1 wherein said lipid has a mole ratio of unsaturated free fatty acids and triglycerides thereof, to saturated free acids and triglycerides thereof, greater than one.

5. The composition of claim 1 wherein said lipid is selected from the group consisting of corn oil, soy oil, safflower oil, sunflower oil and mixtures thereof.

6. The composition of claim 1 wherein said emulsifying agent is selected from the group consisting of emulsifying agents having a Hydrophilic Lipophilic Balance index of from 8 to 14.5; and mono and diglyceride emulsifying agent having an HLB of about from 3 to 3.6, and compatible mixtures thereof.

7. The composition of claim 6 wherein said emulsifying agent is selected from the group of diacetyl tartaric esters of monoglycerides; polyoxyethylene (20) sorbitan monosterate; mono and diglycerides having an HLB of from 3 to 3.6, and compatible mixtures thereof.

8. The composition of claim 7 wherein said emulsifying agent is selected from the group of diacetyl tartaric ester of monoglycerides having a saponification number of about from 405 to 425 and an Iodine Number of about from 60 to 70.

9. The composition of claim 1 wherein said carbohydrate is selected from the group consisting of disaccharides, trisaccharides, tetrasaccharides, oligosaccharides, dextrins, starch, and mixtures thereof.

10. The composition of claim 9 wherein said carbohydrate is selected from the group consisting of sucrose, 5 to 24 dextrose equivalent corn syrup solids; 5 to 42 dextrose equivalent dextrin solids and mixtures thereof.

11. The composition of claim 1 wherein said composition comprises about from 2 to 10%, by dry wt., of nutritional mineral salts.

12. The dry dietary food composition of claim 1 wherein said composition comprises, by dry wt., about from 4 to 22% of said nutritionally balanced peptide mixture, or amino acid supplemented peptide mixture, about from 4 to 22% of said lipid, about from 2 to 84% of said carbohydrate; and about from 2 to 8% of said gelatinized high amylose starch, about from 0.4 to 2% of said water-lipid emulsifying agent and wherein the total free amino acid content of said composition is less than 1.5%.

13. The composition of claim 12 wherein said amino acid residue-amino acid profile essentially corresponds to the amino acid profile of egg albumin.

14. The composition of claim 12 wherein said peptide-amino acid mixture is protein hydrolysate.

15. The composition of claim 12 wherein said lipid has a mole ratio of unsaturated free fatty acids and triglycerides thereof, to saturated free acids and triglycerides thereof, greater than one.

16. The composition of claim 12 wherein said emulsifying agent is selected from the group consisting of emulsifying agents having a Hydrophilic Lipophilic Balance Index of from 8 to 15.0; and mono and diglyceride emulsifying agent having a Hydrophilic Lipophilic Balance Index of about from 3 to 4, and compatible mixtures thereof.

17. The composition of claim 12 wherein said carbohydrate is selected from the group consisting of disaccharides, trisaccharides, tetrasaccharides, oligosaccharides, dextrins, starch, and mixtures thereof.

18. The composition of claim 12 wherein said composition comprises about from 2 to 10%, by dry wt., of nutritional mineral salts selected from the group consisting of the salts of calcium, potassium, sodium, phosphorous, magnesium, manganese, iron, copper, zinc, iodine and mixtures thereof.

19. The composition of claim 1 wherein about from 70 to 85%, by wt., of said lipid is composed of medium chain fatty acid triglycerides having from six through 12 carbon atoms in the fatty acid moiety thereof and mixtures of such triglycerides; and wherein said medium chain fatty acid triglyceride contains at least 95%, by wt., of fatty acid triglycerides triglycerides from six through 10 carbon atoms in the fatty acid moiety thereof.

20. The composition of claim 19 wherein said lipid has a mole ratio of unsaturated free fatty acids and triglycerides thereof, to saturated free acids and triglycerides thereof, greater than one.

21. A dry dietary food composition, for consumption mixed with water as an aqueous emulsion having improved stability, comprising, by dry wt., about from 10 to 13% of a nutritionally balanced fish hydrolysate peptide mixture containing about from 10 to 15% amino acids, having an amino acid residue-amino acid profile sufficient to support normal human physiological functions; about from 8 to 12% lipid, said lipid containing sufficient linoleic acid or esters threof, to provide said composition with a linoleic acid source content of at least 0.4%; about from 60 to 75% carbohydrate; about from 3 to 4% of a gelatinized high amylose starch, containing at least 50%, by wt., amylose; and about from 0.6 to 1% of a water-lipid emulsifying agent, and wherein said composition has a weight ratio of said high amylose starch to said lipid of at least 0.25, and wherein the total high amylose starch content of said composition is 16% or less and the total starch content is 20% or less and the total free amino acid content of said composition is less than 1.5% and wherein said lipid has a mole ratio of unsaturated free fatty acids and triglycerides thereof, to saturated free acids and triglycerides thereof, in excess of one.

22. The composition of claim 21 wherein said total amino acid profile essentially corresponds to the amino acid profile of egg albumin.

23. The composition of claim 21 wherein said composition comprises about from 2 to 3.5%, by dry wt., of nutritional mineral salts selected from the group consisting of the salts of calcium, potassium, sodium, phosphorous, magnesium, manganese, iron, copper, zinc, iodine and mixtures thereof.

24. The composition of claim 21 wherein said emulsifying agent is selected from the group of diacetyl tartaric ester of monoglycerides having a saponification number of about from 405 to 425 and an Iodine Number of about from 60 to 70.

25. The composition of claim 21 wherein said composition comprises about from 0.05 to 0.2% of a flavoring agent.

26. The composition of claim 21 wherein about from 70 to 85% by wt., of said lipid is composed of medium chain fatty acid triglycerides having from six through 12 carbon atoms in the fatty acid moiety thereof and mixtures of such triglycerides; and wherein said medium chain fatty acid triglyceride contains at least 95%, by wt., of fatty acid triglycerides having from six through 10 carbon atoms in the fatty acid moiety thereof.

27. A dietary food composition consisting essentially of an aqueous emulsion of the composition of claim 1, said emulsion having a solids content of about from 10 to 50%, by wt., an osmolality of less than 650 milliosmoles and a viscosity of about from 2 to 100 centipoise.

28. The composition of claim 27 wherein said aqueous emulsion has a solids content of about from 20 to 50%, by wt.

29. The composition of claim 27 wherein said aqueous emulsion has a solids content of about from 15 to 30%, by wt.

30. The composition of claim 27 wherein said emulsion contains on a dry wt. basis less than 6.5% of said high amylose starch and has a viscosity of about from 2 to 18 centipoise.

31. A dietary food composition consisting essentially of an aqueous emulsion of the composition of claim 21, said emulsion having a solids content of about from 10 to 50%, by wt., an osmolality of less than 500 milliosmoles and a viscosity of about from 2 to 100 centipoise.

32. The composition of claim 31 wherein said emulsion has a solids content of about 15 to 30%, by wt.

33. A dietary food composition consisting essentially of an aqueous emulsion of the composition of claim 19, said emulsion having a solids content of about from 10 to 50%, by wt., an osmolality of less than 500 milliosmoles and a viscosity of about from 2 to 100 centipoise.

34. A dietary food composition consisting essentially of an aqueous emulsion of the composition of claim 26, said emulsion having a solids content of about from 10 to 50%, by wt., an osmolality of less than 500 milliosmoles and a viscosity of about from 2 to 100 centipoise.

35. A process for preparing the composition of claim 1 which comprises the steps of
  a. providing an aqueous mixture containing said peptide or peptide-amino acid mixture, said lipid, said carbohydrate, said high amylose starch and said emulsifying agent in the relative proportion desired in said composition of claim 1, said aqueous mixture having a solids content of about 20 to 60% wt.;
  b. homogenizing said aqueous mixture of step (a);
  c. passing the homogenized mixture through a steam injector operating at temperatures of about from 120° to 150°C and pressures of about from 70 to 95 psig; and
  d. spray drying the steam injected product thereby yielding the composition of claim 1.

36. A process for preparing an aqueous emulsion of the composition of claim 1, which comprises the steps of:
  a. providing an aqueous mixture containing said peptide or peptide-amino acid mixture, said lipid, said carbohydrate, said high amylose starch and said emulsifying agent in the relative proportion desired in said composition of claim 1, said aqueous mixture having a solids content of about 20 to 60% wt.;
  b. homogenizing said aqueous mixture of step (a); c. passing the homogenized mixture through a steam injector operating at temperatures of about from 120° to 150°C and pressures of about from 70 to 95 psig; and wherein said steam injection is controlled to yield an emulsion having a solids content of at least 10% wt.

37. The process of claim 36 wherein the emulsion product of step (c) is canned.

38. A dry dietary food composition, for consumption mixed with water as an aqueous emulsion having improved stability, comprising, by dry wt., about from 3 to 40% of a nutritionally balanced mixture of amino acids, or pharmaceutically acceptable salts thereof having a total amino acid profile sufficient to support normal human physiological functions; about from 2 to 20% lipid, said lipid containing sufficient linoleic acid or esters thereof; to provide said composition with a linoleic acid source content of at least 0.4%; about from 7.5 to 90% carbohydrate; about from 1 to 16% of a gelatinized high amylose starch, containing at least 50%, by wt., amylose; and about from 0.1 to 12% of a water-lipid emulsifying agent, and wherein said composition has a weight ratio of said high amylose starch to said lipid of at least 0.3, and wherein the total high amylose starch content of said composition is 16% or less and the total starch content is 20%.

39. The composition of claim 38 wherein said amino acid profile essentially corresponds to the amino acid profile of egg albumin.

40. The composition of claim 38 wherein said dietary food composition comprises up to 4%, by wt., of amino acid chained compound selected from the group of peptides, proteins and mixtures thereof, and wherein the total quantity of said amino acids, or pharmaceutically acceptable salts thereof, and said amino acid chained compounds is 40%, wt., or less.

41. The composition of claim 38 wherein said lipid has a mole ratio of unsaturated free fatty acids and triglycerides thereof, to saturated free acids and triglycerides thereof, greater than one.

42. The composition of claim 38 wherein about from 70 to 85%, by wt., of said lipid is composed of medium chain fatty acid triglycerides having from six through 12 carbon atoms in the fatty acid moiety thereof and mixtures of such triglycerides; and wherein said medium chain fatty acid triglyceride contains at least 95%, by wt., of fatty acid triglycerides having from six through 10 carbon atoms in the fatty acid moiety thereof.

43. The composition of claim 42 wherein said lipid has a mole ratio of unsaturated free fatty acids and triglycerides thereof, to saturated free acids and triglycerides thereof, greater than one.

44. The composition of claim 38 wherein said carbohydrate is selected from the group consisting of disaccharides, trisaccharides, tetrasaccharides, oligosaccharides, dextrins, starch, and mixtures thereof.

45. The composition of claim 38 wherein said composition comprises, by dry wt., about from 4 to 22% of said amino acid mixture; about from 22 to 85% of said carbohydrate, about from 4 to 15% of said lipids; about from 3 to 10% wt. gelatinized high amylose starch and about from 0.6 to 3% of said water-lipid emulsifying agent.

46. The composition of claim 45 wherein said amino acid profile essentially corresponds to the amino acid profile of egg albumin.

47. The composition of claim 45 wherein said lipid has a mole ratio of unsaturated free fatty acids and triglycerides thereof, to saturated free acids and triglycerides thereof, greater than one.

48. The composition of claim 45 wherein about from 70 to 85%, by wt., of said lipid is composed of medium chain fatty acid triglycerides having from six through 12 carbon atoms in the fatty acid moiety thereof and mixtures of such triglycerides; and wherein said medium chain fatty acid triglyceride contains at least 95%, by wt., of fatty acid triglycerides having from six through 10 carbon atoms in the fatty acid moiety thereof.

49. The composition of claim 45 wherein said carbohydrate is selected from the group consisting of disaccharides, trisaccharides, tetrasaccharides, oligosaccharides, dextrins, starch, and mixtures thereof.

50. A dietary food composition consisting essentially of an aqueous emulsion of the composition of claim 38, said emulsion having a solids content of about from 10 to 50%, by wt., an osmolality of less than 650 milliosmoles and a viscosity of about from 2 to 100 centipoise.

51. A dietary food composition consisting essentially of an aqueous emulsion of the composition of claim 46, said emulsion having a solids content of about from 10 to 50%, by wt., an osmolality of less than 650 milliosmoles and a viscosity of about from 2 to 100 centipoise.

52. A process for preparing the composition of claim 38 which comprises the steps of
  a. providing an aqueous mixture containing said peptide or peptide-amino acid mixture, said lipid, said carbohydrate, said high amylose starch and said emulsifying agent in the relative proportion desired in said composition of claim 38, said aqueous mixture having a solids content of about 20 to 60% wt.;
  b. homogenizing said aqueous mixture of step (a);
  c. passing the homogenized mixture through a steam injector operating at temperatures of about from 120° to 150°C and pressures of about from 70 to 95 psig; and
  d. spray drying the steam injected product thereby yielding the composition of claim 38.

53. A process for preparing an aqueous emulsion of the composition of claim 38, which comprises the steps of:
  a. providing an aqueous mixture containing said peptide or peptide-amino acid mixture, said lipid, said carbohydrate, said high amylose starch and said emulsifying agent in the relative proportion desired in said composition of claim 38, said aqueous mixture having a solids content of about 20 to 60% wt.;
  b. homogenizing said aqueous mixture of step (a);
  c. passing the homogenized mixture through a steam injector operating at temperatures of about from 120° to 150°C and pressures of about from 70 to 95 psig; and wherein said steam injection is controlled to yield an emulsion having a solids content of at least 10% wt.

54. The process of claim 53 wherein the emulsion product of step (c) is canned.

* * * * *